(12) United States Patent
Wang et al.

(10) Patent No.: US 7,441,906 B1
(45) Date of Patent: Oct. 28, 2008

(54) KEYSTONE CORRECTION SYSTEM AND METHOD

(75) Inventors: Zhongde Wang, Camas, WA (US); Ashok Aravamudhan, Beaverton, OR (US); Mike West, Portland, OR (US); Dennis Morel, Lake Oswego, OR (US)

(73) Assignee: Pixelworks, Inc., Tualatin, OR (US)

( * ) Notice: Subject to any disclaimer, the term of this patent is extended or adjusted under 35 U.S.C. 154(b) by 281 days.

(21) Appl. No.: 11/175,786

(22) Filed: Jul. 5, 2005

(51) Int. Cl.
*G03B 21/14* (2006.01)
*H04N 3/22* (2006.01)

(52) U.S. Cl. .................. 353/70; 353/121; 348/745

(58) Field of Classification Search .............. 353/69, 353/70, 121; 348/745–747
See application file for complete search history.

(56) References Cited

U.S. PATENT DOCUMENTS

| | | | |
|---|---|---|---|
| 5,355,188 A | 10/1994 | Biles et al. | |
| 5,548,357 A | 8/1996 | Appel et al. | 353/69 |
| 5,720,539 A | 2/1998 | Woo | 353/69 |
| 5,764,311 A | 6/1998 | Bonde et al. | 348/746 |
| 5,795,046 A | 8/1998 | Woo | 353/69 |
| 6,056,408 A | 5/2000 | Kobayashi | |
| 6,169,535 B1 | 1/2001 | Lee | |
| 6,191,827 B1 | 2/2001 | Segmen | 348/746 |
| 6,289,735 B1 | 9/2001 | Dister | |
| 6,305,805 B1 | 10/2001 | Liebenow | 353/69 |
| 6,310,662 B1 | 10/2001 | Sunakawa et al. | |
| 6,339,434 B1 | 1/2002 | West et al. | 345/667 |
| 6,367,933 B1 * | 4/2002 | Chen et al. | 353/69 |
| 6,481,855 B2 | 11/2002 | Oehler | 353/70 |
| 6,491,400 B1 | 12/2002 | Chen | 353/70 |
| 6,520,547 B2 | 2/2003 | Robinson | 285/330 |
| 6,520,646 B2 | 2/2003 | Rodriguez | 353/69 |
| 6,520,647 B2 | 2/2003 | Raskar | 353/70 |
| 6,592,228 B1 | 7/2003 | Kawashima et al. | 353/101 |
| 6,611,260 B1 | 8/2003 | Greenberg | 345/204 |
| 6,686,973 B2 | 2/2004 | Su et al. | 348/745 |
| 6,793,347 B2 | 9/2004 | Morishita | 353/119 |
| 6,836,298 B2 | 12/2004 | Song et al. | |
| 6,843,569 B2 | 1/2005 | Hirao et al. | |
| 6,846,081 B2 | 1/2005 | Mochizuki et al. | 353/70 |
| 6,867,753 B2 | 3/2005 | Chinthammit et al. | |
| 6,892,409 B1 | 5/2005 | Kaup et al. | |
| 6,962,417 B1 | 11/2005 | Teng et al. | 353/70 |
| 6,963,348 B2 | 11/2005 | Diamond et al. | |
| 6,974,217 B2 | 12/2005 | Kimura | |
| 6,997,563 B1 | 2/2006 | Wang et al. | |
| 2001/0000300 A1 | 4/2001 | Haile-mariam | |
| 2002/0008697 A1 | 1/2002 | Deering | |
| 2002/0060754 A1 * | 5/2002 | Takeuchi | 348/745 |
| 2002/0063726 A1 | 5/2002 | Jouppi | |
| 2002/0089651 A1 | 7/2002 | Ejiri et al. | |
| 2002/0109668 A1 | 8/2002 | Rosenberg et al. | |
| 2003/0234797 A1 | 12/2003 | Williams et al. | |
| 2004/0036844 A1 | 2/2004 | Wood et al. | 353/70 |

(Continued)

*Primary Examiner*—Andrew T Sever
(74) *Attorney, Agent, or Firm*—Marger Johnson & McCollom, P.C.

(57) ABSTRACT

We describe a keystone correction system and method. A vertical scalar vertically scales an input image and stores the results to a line buffer. A horizontal scalar retrieves the stored results from the line buffer and horizontally scales the stored results using the relatively small number of lines from the line buffer. The system repeats the vertically scaling, storing, and horizontal scaling until it processes all input image lines.

24 Claims, 16 Drawing Sheets

U.S. PATENT DOCUMENTS

2004/0095317 A1 5/2004 Zhang et al.
2005/0168705 A1* 8/2005 Li et al. .................... 353/69
2006/0203207 A1* 9/2006 Ikeda et al. ................. 353/70
2006/0204125 A1* 9/2006 Kempf et al. ............... 382/274

* cited by examiner

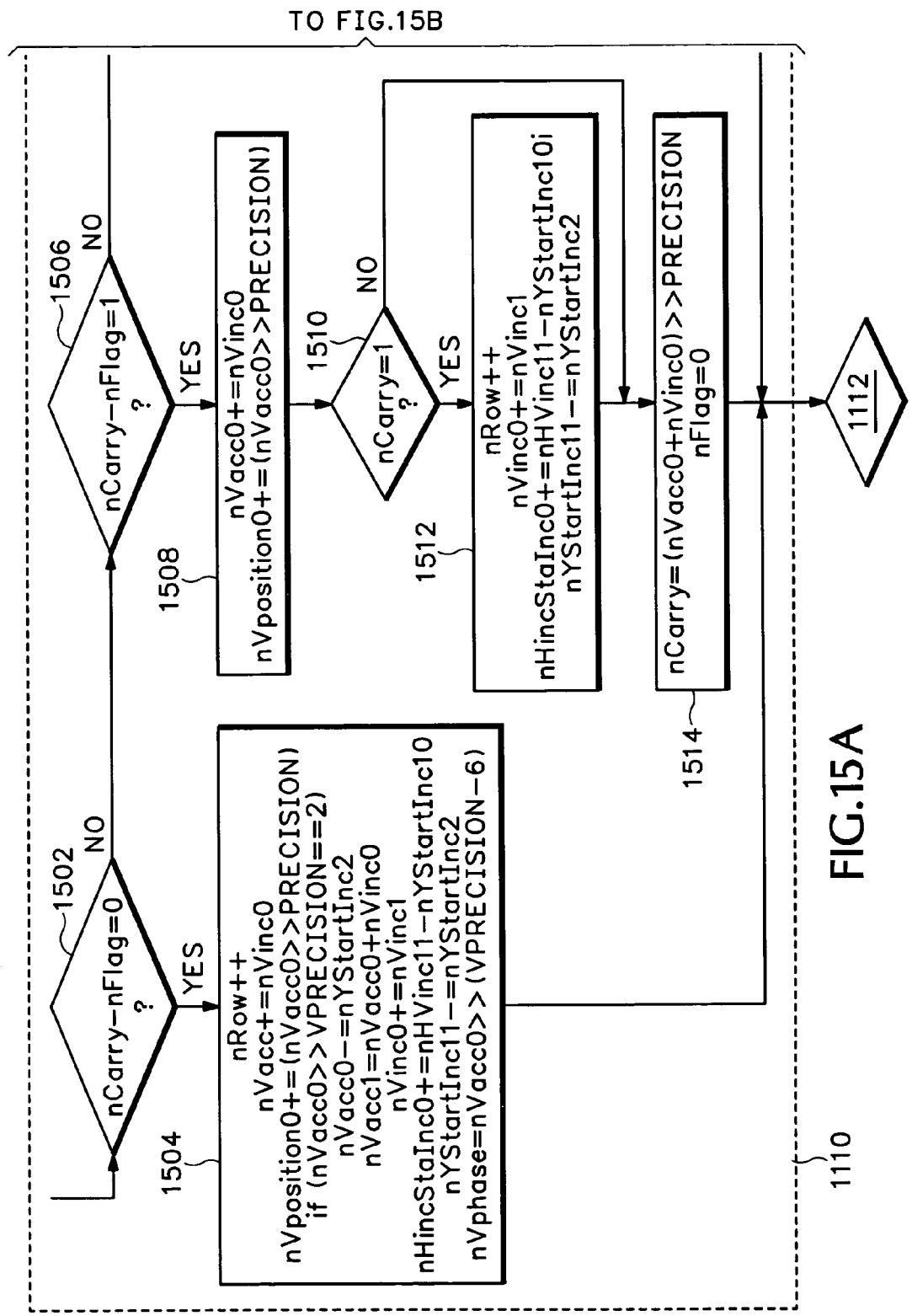

KEYSTONE CORRECTION SYSTEM AND METHOD

BACKGROUND

We describe a system and method capable of projecting images and, more particularly, a system and method of keystone correction.

Use of digital projection systems for lecture, presentation environments, and for home entertainment continues to increase. The projection system, including a projector, casts a digital image onto a planar screen, wall, or other display. The projector may project a still frame, such as a slide or photo. Or the projector may project a video signal, comprising a rapid succession of frames. Projector electronics process the digital image, and then output a corresponding pixelated image from the projector's optical system. A projection lens controls projected image size and focus. A projection axis is defined as an axis along the center of projection lens to the center of the projected image. The projection lens is usually offset from an optical axis to raise a projection axis well-above horizontal for viewing convenience.

If the projector system casts the image onto a screen or display that is not perpendicular to the projection axis, the projected image will distort. That is, the image will appear stretched, deformed, or otherwise misshapen. This distortion is called keystone because the distorted projected image may take on the architectural shape of the same name.

FIG. 1 shows a projector 10 tilted above horizontal, causing its projected image 20 onto a screen 15 to be keystone distorted into a trapezoid (indicated by the dashed line).

FIG. 1 also shows a keystone-corrected image 25, corrected by a horizontal scaling. Keystone distortion caused by an up or down tilt of the projector is correctable by a horizontal scaling of the digital image. Keystone distortion caused by a right or left panning of the projector is correctable by a vertical scaling of the digital image.

Horizontal or vertical scaling a digital image tends to be memory intensive. For example, a single XGA (resolution) frame has 1024×768 pixels, each pixel having encoding for the three primary colors. Any process that manipulates a video signal, which may consist of 20 to 30 frames per second, needs to work fast and efficiently frame-by-frame. To this end, a frame buffer may be used in conjunction for scaling to store an input image or an intermediate image. A frame buffer, however, is costly to implement.

Accordingly, a need remains for an improved keystone correction system and method.

BRIEF DRAWINGS DESCRIPTION

The foregoing and other objects, features, and advantages of embodiments will become more readily apparent from the detailed description that references the following drawings.

Figure 11:
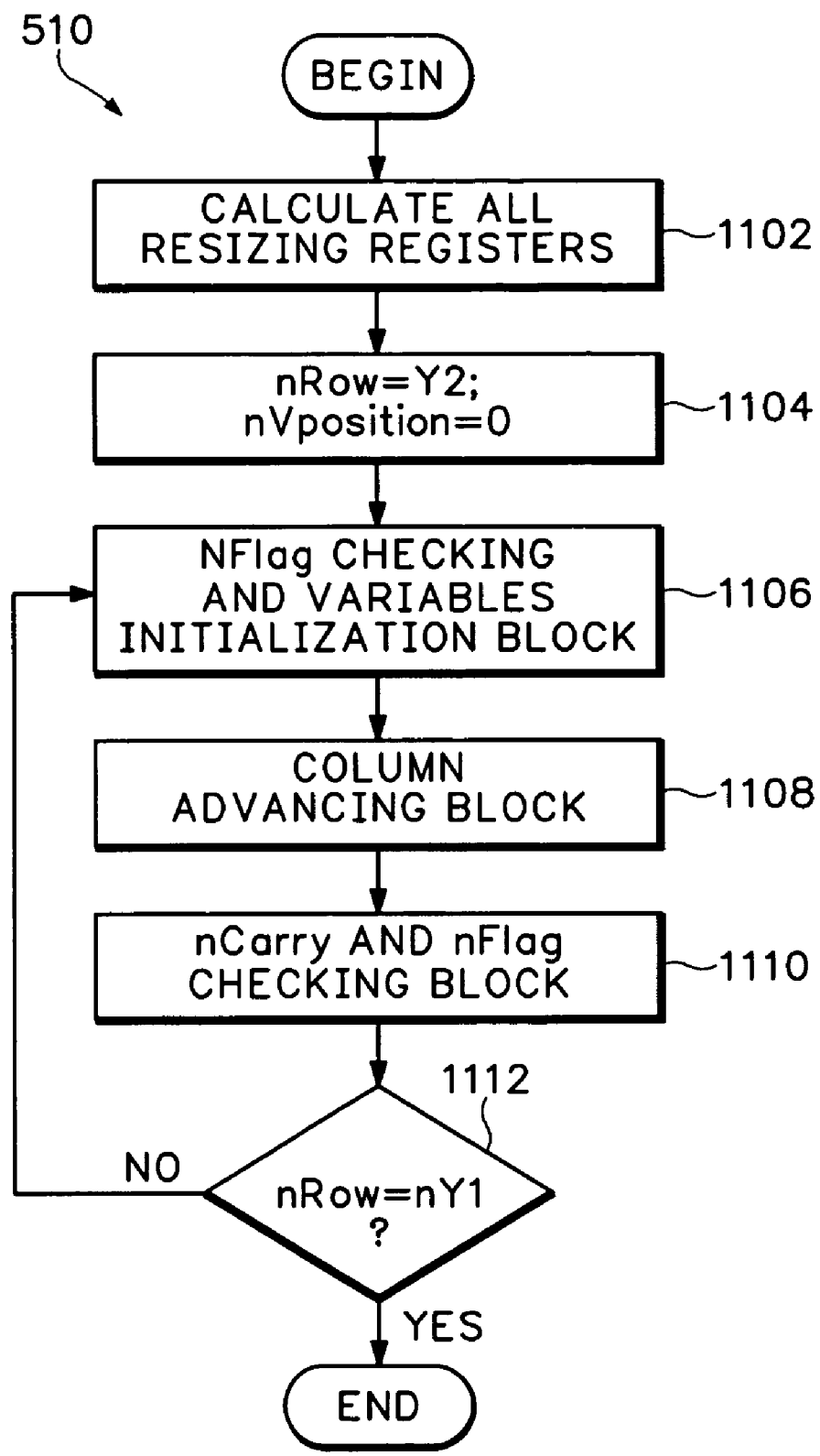
FIG. 11 is a flow diagram of an embodiment of an operation of the vertical scalar associated with block 510 of FIG. 5.
Figure 14A:
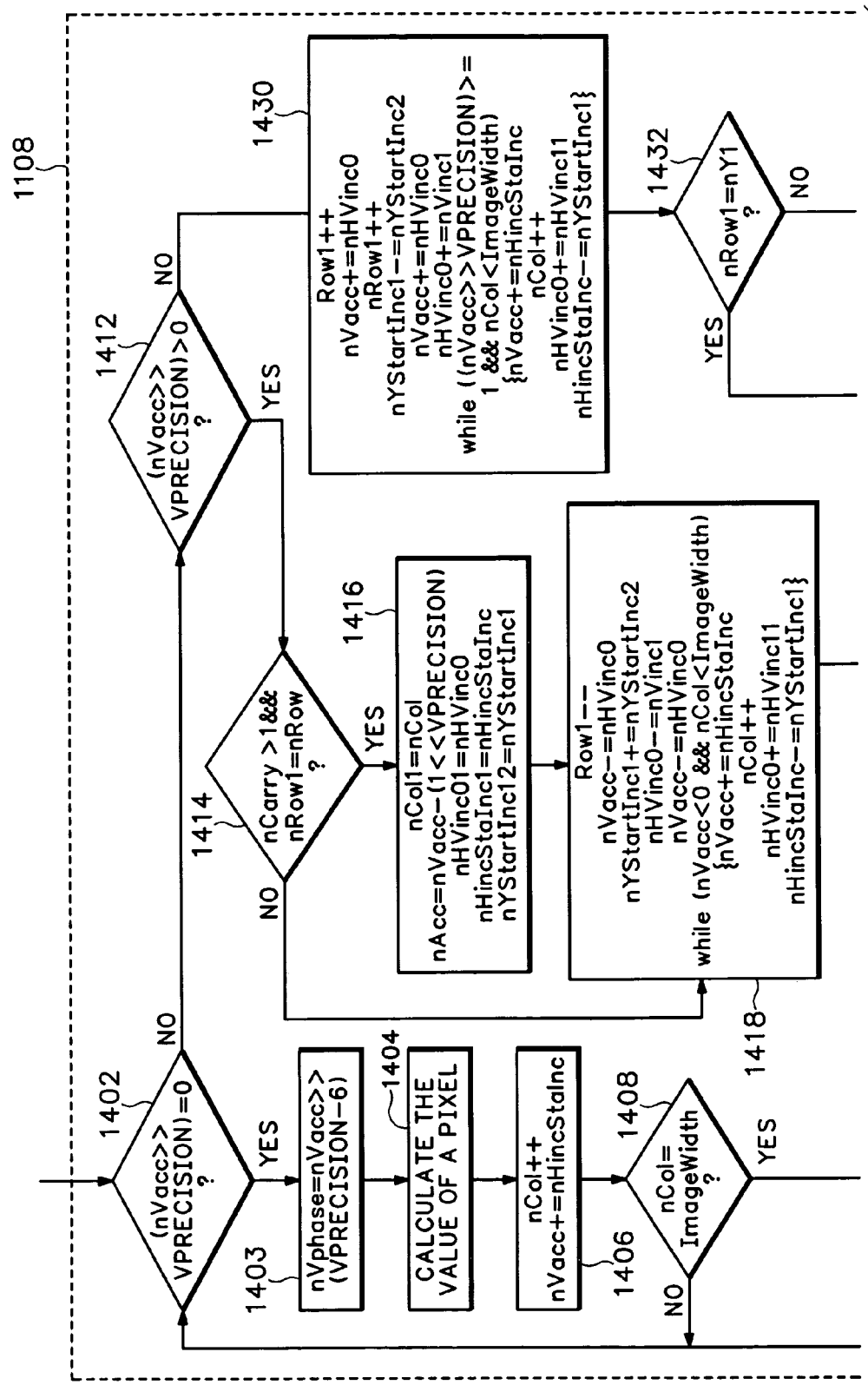
Figure 14B:
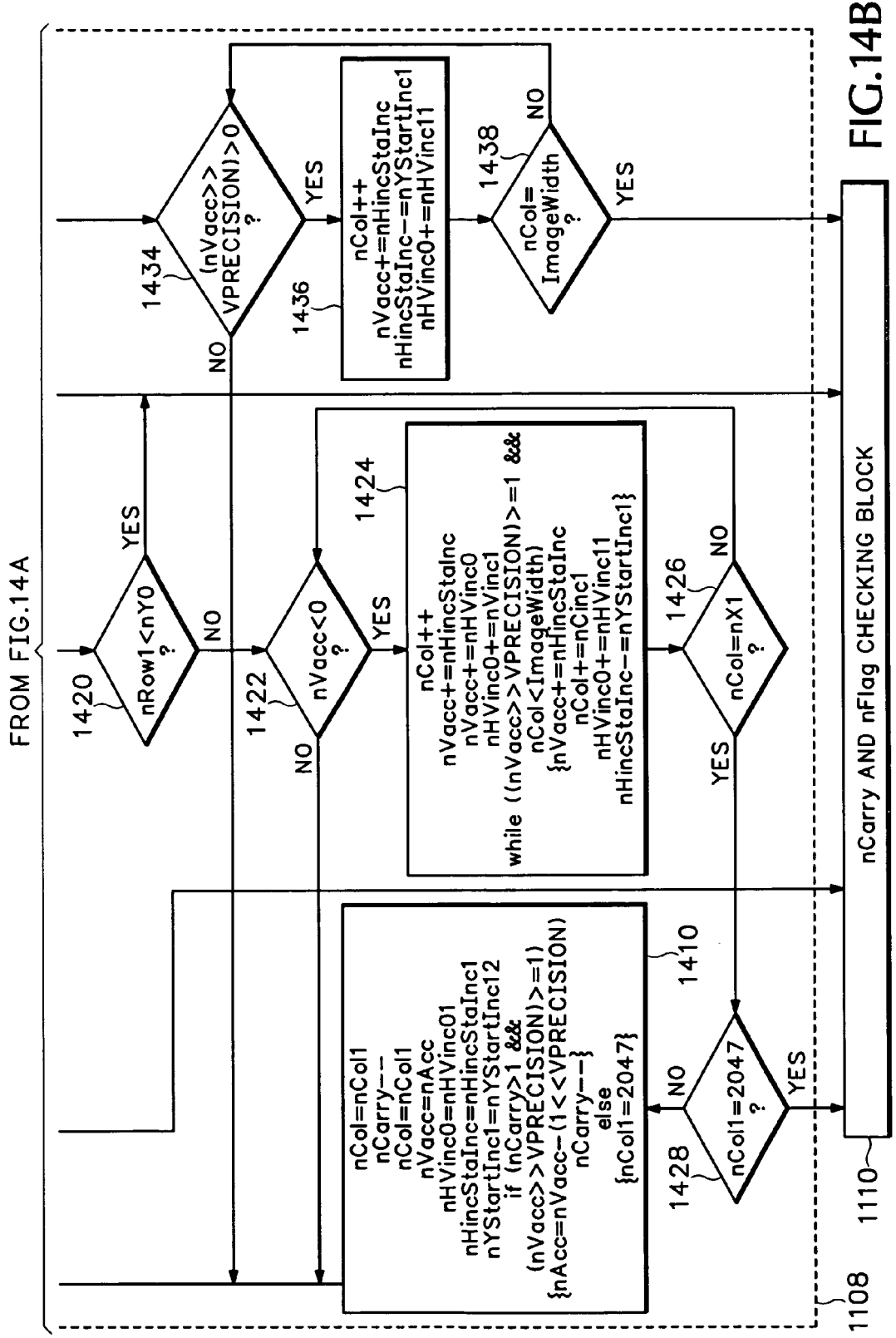

FIGS. 14A-B are a block diagram of an embodiment of the advancing circuit associated with block 1108 of FIG. 11.

Figure 15B:
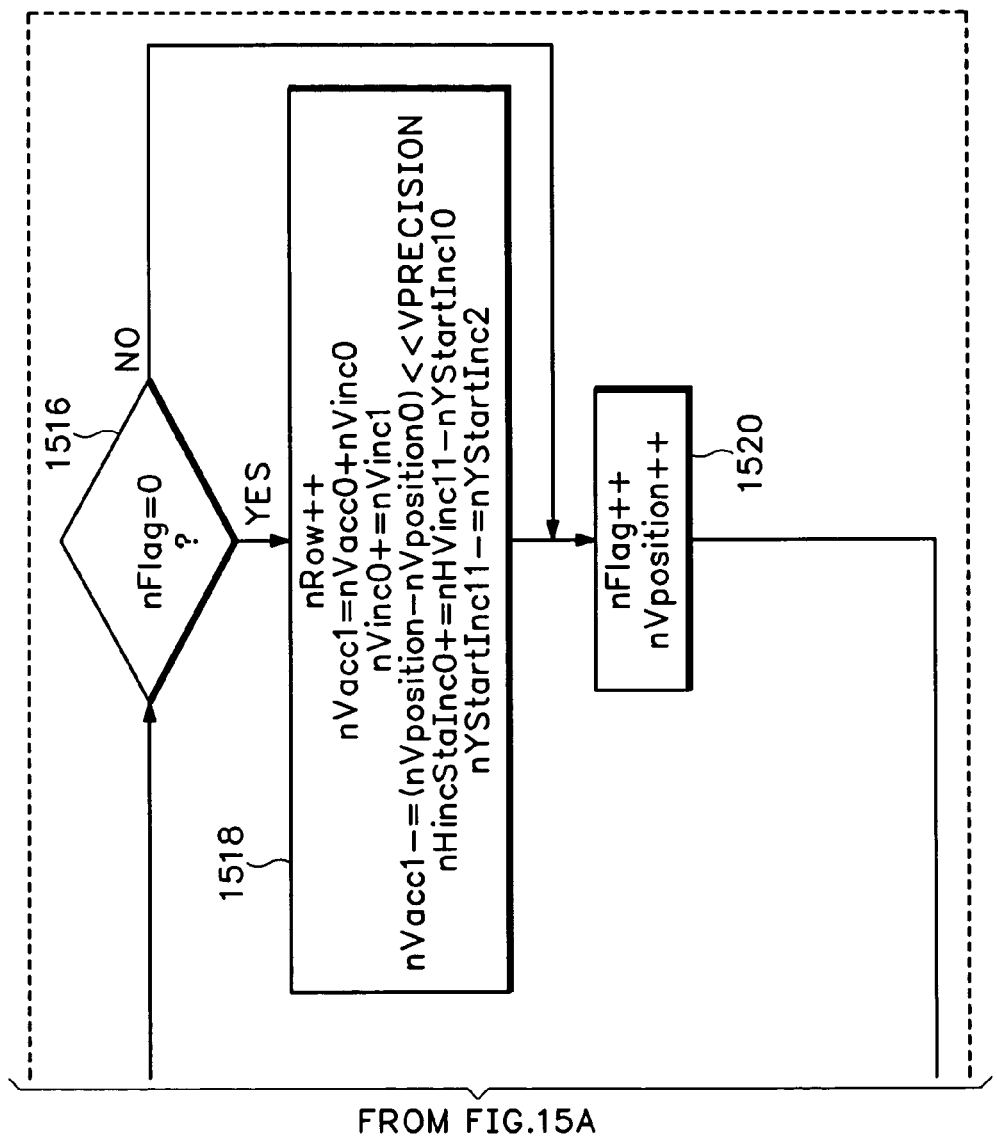

FIG. 15 is a block diagram of an embodiment of the checking circuit associated with block 1110 of FIG. 11.

DETAILED DESCRIPTION

There are various methods for correcting keystone distortion including manually or automatically adjusting a projector's optics. Another method involves automatically predistorting the image such that when projected, the image appears to have little or no keystone distortion. Predistorting the image generally involves intelligently scaling the image horizontally, vertically, or both. Manual and automatic keystone correction methods are described, for example, in pending U.S. patent application Ser. Nos. 10/723,002 filed Nov. 23, 2003, 10/753,830 filed Jan. 5, 2004, 10/849,998 filed May 19, 2004, 10/753,833 filed Jan. 5, 2004, 10/832,488 filed Apr. 26, 2004, 10/932,597 filed Sep. 1, 2004, all commonly assigned to Pixelworks. We incorporate all these applications by reference.

Figure 2:
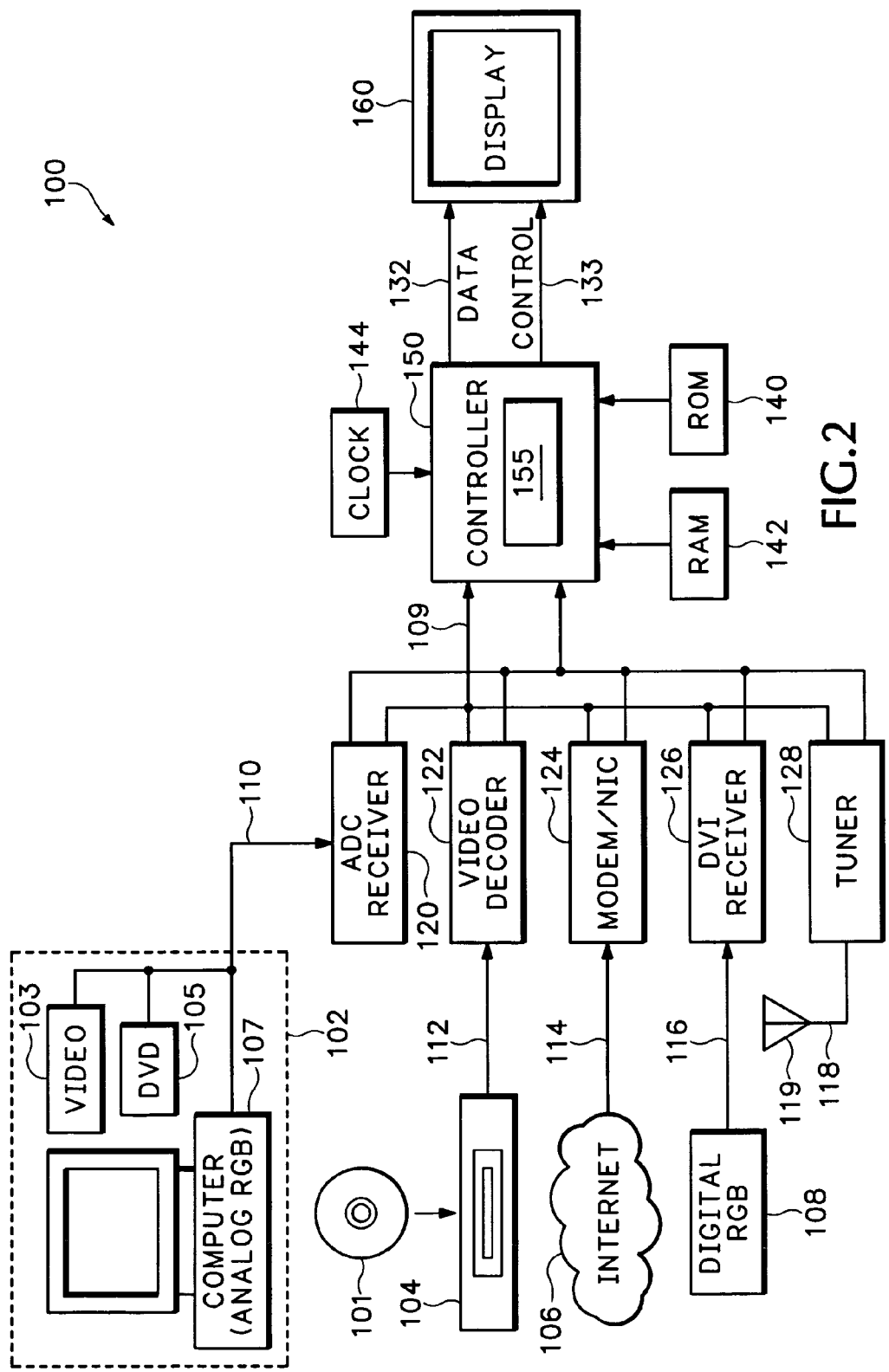
FIG. 2 is a block diagram of a projection system.

FIG. 2 is a block diagram of a display system 100. Referring to FIG. 2, the system 100 includes a receiver 120 for receiving an analog image data signal 110, e.g., RGB or $YP_BP_R$ signal, from a source 102. The source 102 may be a personal computer 107, a digital video disk player 105, set top block (STB) 103, or any other device capable of generating the analog image data signal 110. The receiver 120 may be an analog-to-digital converter (ADC) or any other device capable of generating digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the display controller 150. The decoder is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving and/or decoding data 114 from a network 106. The modem 124 provides digital video signal 109 to the display controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the display controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals may be processed separately and, ideally, encoding into a composite video signal occurs only once, prior to transmission. The digital video signal 109 may be a stream of digital numbers describing a continuous analog video waveform in either composite or component form. FIG. 2 describes a variety of devices (and manners) in which the digital video signal 109 may be generated from an analog video signal or other sources. A person of reasonable skill in the art should recognize other devices for generating the digital video signal 109 come within the scope of the application.

In FIG. 2, the controller 150 is shown as receiving the digital video signal 109. Alternatively, the controller 150 may receive an analog signal, e.g., analog image data signal 110 from the video 103, DVD 105, and/or computer 107. In the later case, the controller 150 may include means for receiving and converting the analog signal into the digital signal 109, e.g., ADC receiver 120 or video decoder 122.

The controller 150 may generate image data 132 and control signals 133 by manipulating the digital video signal 109 or any other signal it receives at its input. The display controller 150 generates the image data 132 and control signals 133 for projection to a display 160. In an embodiment, the display 160 is a television either analog (e.g., Cathode Ray Tube (CRT)), digital (e.g., High Definition Television (HDTV)), or otherwise. The display 160 may be digital with a fixed pixel structure, e.g., active and passive LCD displays, plasma displays (PDP), field emissive displays (FED), electro-luminescent (EL) displays, micro-mirror technology displays, low temperature polysilicon (LTPS) displays, and the like. The display 160 may be other than a digital display, e.g., an analog display such as a CRT as used in monitors, projectors, personal digital assistants, and other like applications.

In an embodiment, the controller 150 may scale the digital video signal 109 for projection using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. We will not discuss scaling, resolution, frame, and/or pixel rate conversion, and/or color manipulation in any further detail. A person of reasonable skill in the art should recognize that the controller 150 may manipulate the video signal 109 and provides the image data 132 and control signals 133 for projection to the display 160 regardless of display type.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

The controller 150 may include a keystone controller 155 to keystone correct the digital video signal 109 by predistorting the signal 109. The keystone controller 155 may use projector parameters such as a projector's vertical tilt and horizontal pan angles as well as user-selected keystone correction settings to predistort the signal 109 and keystone correct the image 25. We describe the keystone controller 155 in more detail below.

Figure 3:
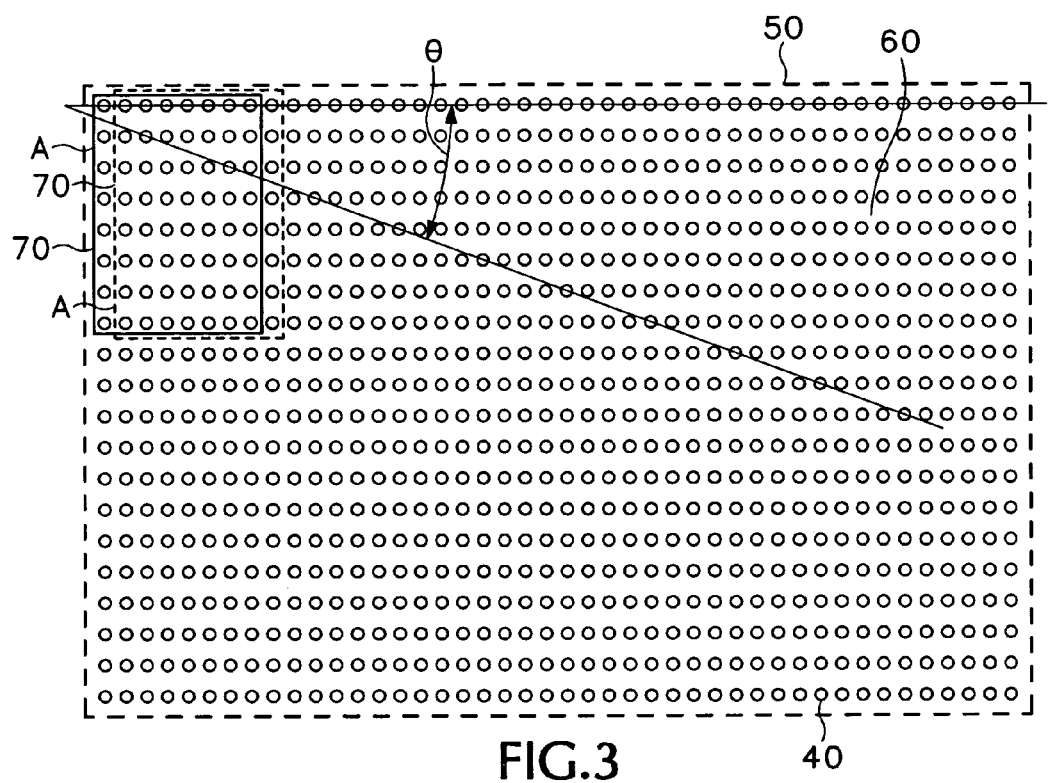
FIG. 3 is a graphical representation of a pixel array used to illustrate an embodiment of a keystone correction system and method.

FIG. 3 is a graphical representation of a pixel array 40 to illustrate a keystone correction method. In an embodiment the pixel array 40 is representative of an input image frame in video signal 109. A goal is to predistort the video signal 109 to counteract a keystone distortion that will otherwise occur at the display. The system and method may predistort the signal 109 frame by frame or otherwise.

The keystone controller 155 may predistort the pixel array 40 in such a way as to have the top edge 50 projected along a new top edge 60, rotated from the top edge 50 by an angle θ. The keystone controller 155 may perform this realignment of the top edge 50 by scaling the pixel array 40 (and the image frame or portion it may represent) and replacing the truncated part of the pixel array 40 with dark (null) pixels. A frame buffer memory (not shown) may store the pixel array 40 during scaling. A sub-image pixel block 70 from the array 40 is retrieved from the frame buffer memory. The pixel block 70 can have any number of pixels but for simplicity, block 70 as an 8×8 pixel block.

The first pixel block 70 retrieved is typically on the left side of the pixel array 40, e.g., at position A, but it can be initially positioned anywhere. After the system processes the block 70 at position A, it retrieves and processes a next block 70 at position A' by, e.g., moving to the right by one pixel column. The system gains a new column of pixels on the right while losing a column of pixels on the left. The next pixel block 70 at position A' has a new set of pixels on which subsequent output pixels are based. In this fashion, the input pixel block 70 moves successively rightward, across the image, and respective output pixels are produced for each pixel block 70 at each position. When the rightmost column is reached the process begins again on the left with the input pixel block 70 shifted down to the next line of pixels.

This processing is oftentimes slow and memory intensive because a full frame (for example, 1024×768) of pixels is kept in the frame buffer while the pixel block 70 is scaled or predistorted throughout a full image frame. And the system may be inefficient because if the pixels above the new top edge 60 are to be dark (or null), there is no need to process them with the effort given to the remaining active portions of the array 40. In short, the greater the angle θ, the greater the inefficiency.

According to an embodiment of the invention, the keystone controller 155 predistorts an input video image to compensate for subsequent keystone distortion due to a projection onto a screen or display that is tilted with respect to an optical image plane. The keystone controller 155 predistorts the input video image responsive to parameters that represent the degree of keystone distortion required. The keystone controller 155 predistorts the input video image by processing only a small number of video lines at a time, as it steps through the entire input video image. Processing the small number of video lines may include horizontally scaling the video lines, and then vertically scaling the result. An entire predistorted output image frame is sequentially built up as the keystone controller 155 steps through all sets of video lines constituting the input video image. This method requires less memory because only a small line buffer is needed to store the horizontally scaled video lines until they are vertically scaled, instead of a typical method requiring a full frame buffer during the horizontal and vertical scaling, as we describe above. Thus operating speed and efficiency are increased, while cost is lowered.

Figure 4:
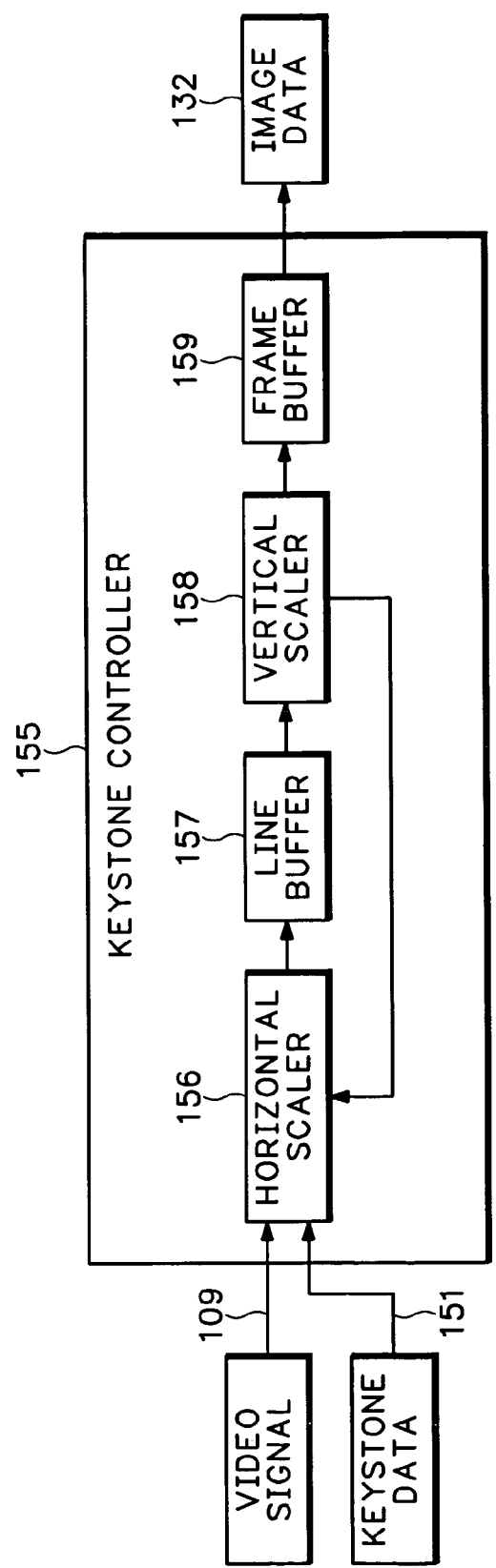
FIG. 4 is a block diagram of an embodiment of a keystone controller of FIG. 2.

FIG. 4 is a block diagram of an embodiment of a keystone controller 155. Referring to FIG. 4, a horizontal scalar 156 receives a digital video signal 109 and keystone data 151. The digital video signal 109 may be from any of the sources we indicated previously referencing FIG. 2. Keystone data 151 may be supplied manually by a user or automatically by external or internal electronics to projector 10 or the display 160 or from a combination of both manual and automatic input. Keystone data 151 may include horizontal pan angle Hkey and/or vertical tilt angle Vkey provided to the controller 150 by a user interacting with the projector 25 directly (e.g., pushing buttons on an LCD screen on the projector 25), by the user interfacing with a graphical interface running on a personal computer (not shown), or otherwise. For example, a user may observe a keystone distortion on a display 160 and adjust electronics to minimize or eliminate keystone distortion. Another option to determine HKey and VKey is an automatic system that determines the amount of keystone distortion on the display 160, perhaps by an optical detection, or a detection of projector orientation. Examples of various techniques may be found in the art in e.g., the previously listed patents assigned to Pixelworks, including U.S. Pat. Nos. 6,520,647 and 6,305,805 and U.S. patent application Ser. No. 10/932,597, to name a few.

And keystone data 151 may include parameters associated with the projector 25 such as parameters that define the projector 25's optics. Keystone data 151 may also include the input image's resolution and the projected image's resolution.

Figure 1:
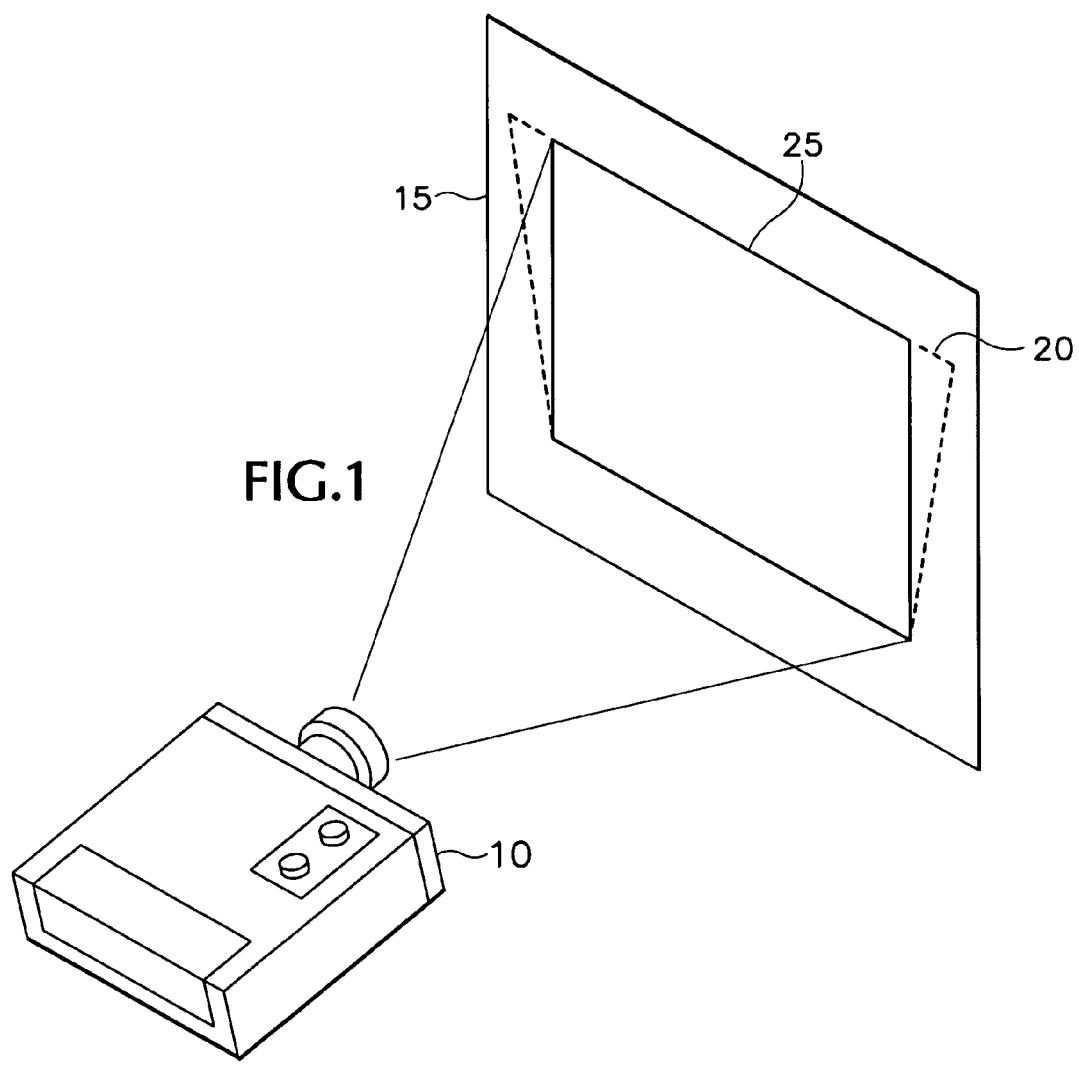
FIG. 1 is a diagram of a projection system.

A horizontal scalar 156 horizontally scales the keystone data 151. The horizontal scalar 156 may utilize any kind of scaling algorithm or technology to horizontally scale the video signal 109 generally and the array 40 particularly. The horizontal scalar 156 outputs horizontally scaled data, e.g., lines, to a line buffer 157. A vertical scalar 158 vertically scales the horizontally scaled data received from the line buffer 157. The vertical scalar 158, like the horizontal scalar 156, may utilize any kind of scaling algorithm or technology to vertically scale the data from the buffer 157. In an embodiment, of the total number of video lines that may constitute a video frame, only a small number are processed simultaneously by the horizontal scalar 156 and stored in the line buffer 157. The vertical scalar 158 vertically scales this small number of lines and outputs the result to, for example, a frame buffer 159. Meanwhile, according to an embodiment, the horizontal scalar 156 and line buffer 157 may concurrently or sequentially process a subsequent set of video lines that the vertical scalar 158 vertically scales and stores in the frame buffer 159, as before. By so doing, the frame buffer 159 may continuously add vertically scaled video lines or pixels to accumulate a video frame. The frame buffer 159 outputs the video frame as image data 132 or provide the video frame to the controller 150 for further processing. The image data 132 is predistorted to correct for keystone distortion such that when projected on the display 160 it appears as undistorted image 25 (FIG. 1).

Figure 5:
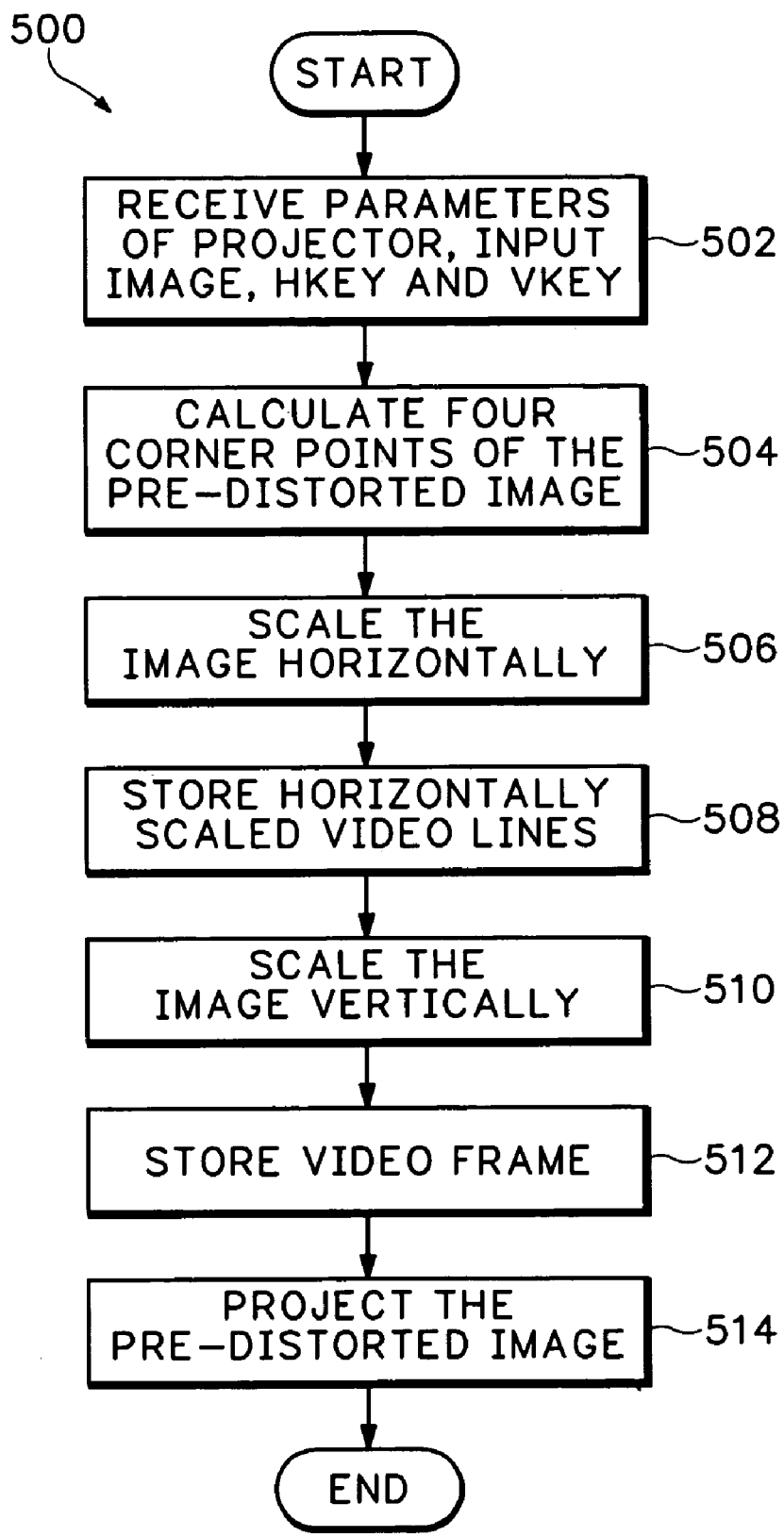
FIG. 5 is a flowchart of an embodiment of a method for keystone correction.
Figure 6:
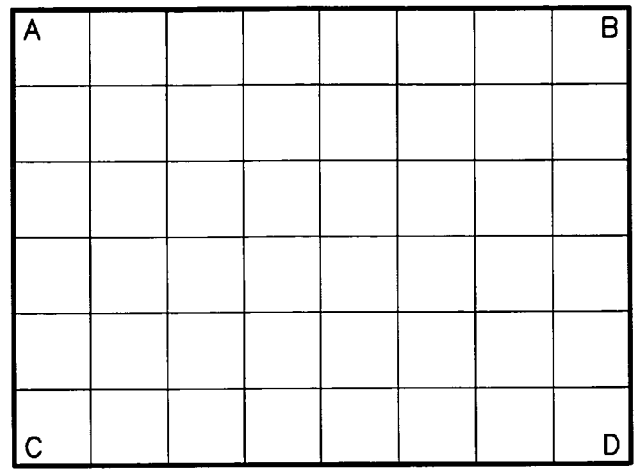
FIG. 6 is a diagram of a distortion-free image.
Figure 7:
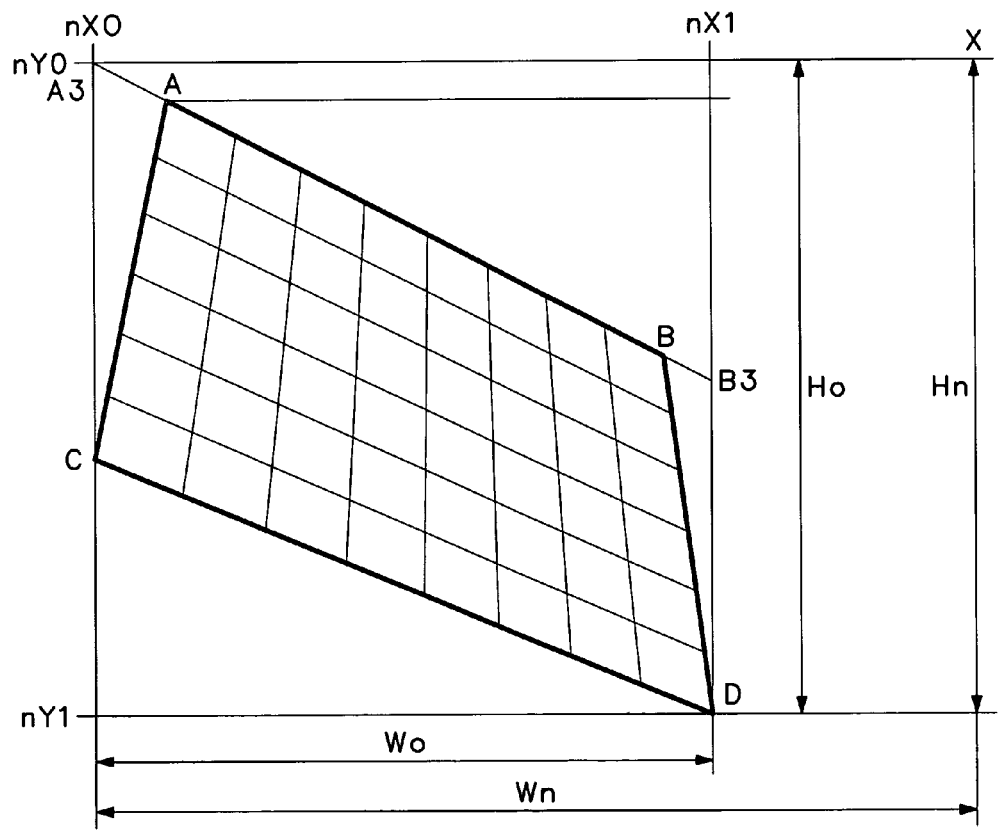
FIG. 7 is a diagram of a predistorted image to correct keystone distortion when a projector is tilted up and panned to the right.
Figure 8:
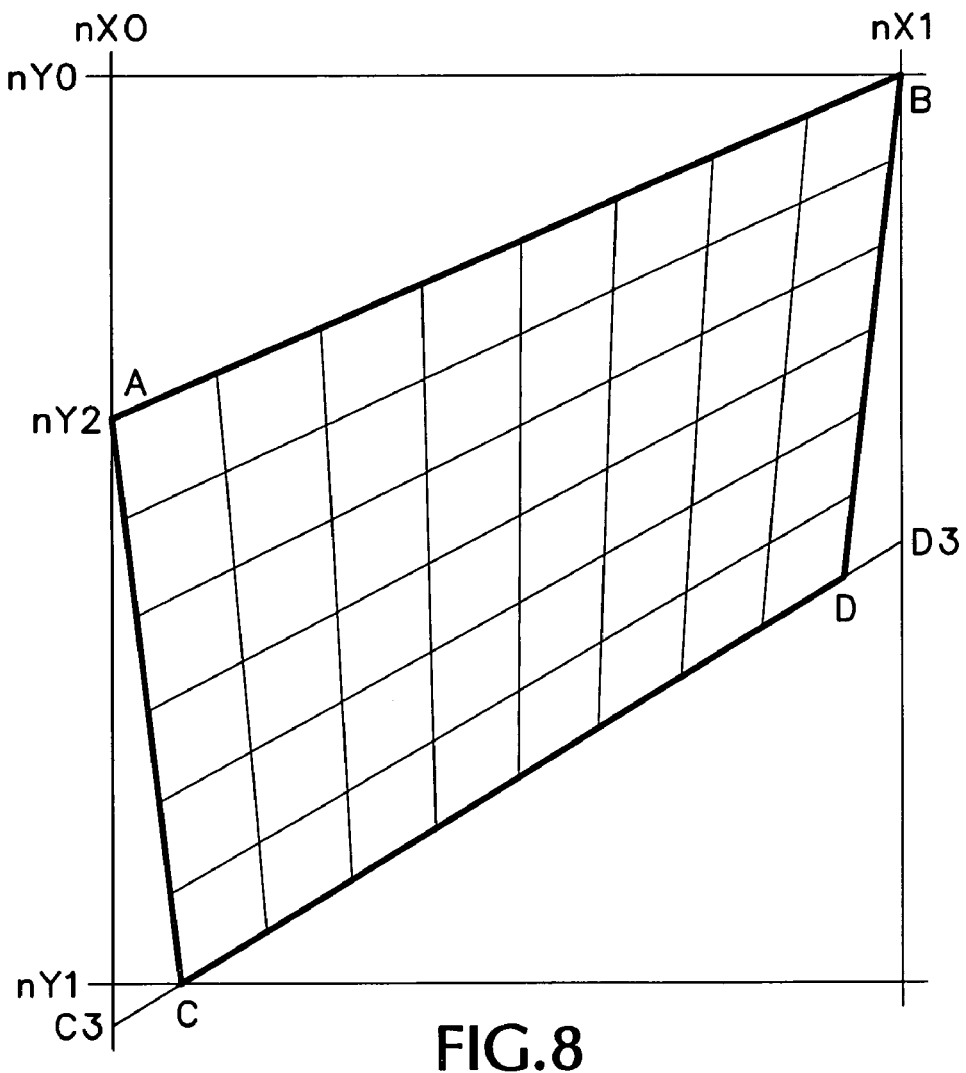
FIG. 8 is a diagram of a predistorted image to correct keystone distortion when a projector is tilted down and panned to the right.

FIG. 5 is a flowchart of an embodiment of a method 500 for keystone correction. FIG. 6 is a diagram of a distortion-free image. FIG. 7 is a diagram of a predistorted image to correct keystone distortion when a projector is tilted up and panned to the right. FIG. 8 is a diagram of a predistorted image to correct keystone distortion when a projector is tilted down and panned to the right.

Referring to FIGS. 4-8, the method 500 includes receiving keystone data 151 and the video signal 109 at block 502. The keystone data 151 may include, e.g., at least one projector parameter, horizontal pan angle Hkey, vertical tilt angle Vkey, input image resolution, and projected image resolution. The at least one projector parameter may include parameters that define the projector 25's optics relative to the display 160. The method 500 may receive other data as necessary.

At block 504, the method 500 calculates the corner points A(Ax, Ay), B(Bx, By), C(Cx, Cy), and D(Dx, Dy) (FIGS. 7 and 8) of the predistorted image responsive to the keystone data 151 (FIGS. 7-8). In an embodiment, the keystone controller 155 calculates the four corner points A(Ax, Ay), B(Bx, By), C(Cx, Cy), and D(Dx, Dy). Referring to FIGS. 7 and 8, an x and a y coordinate are defined to be zero at the upper left corner of a coordinate system. This upper left corner is equivalent to point A in the distortion-free image of FIG. 6.

Figure 9:
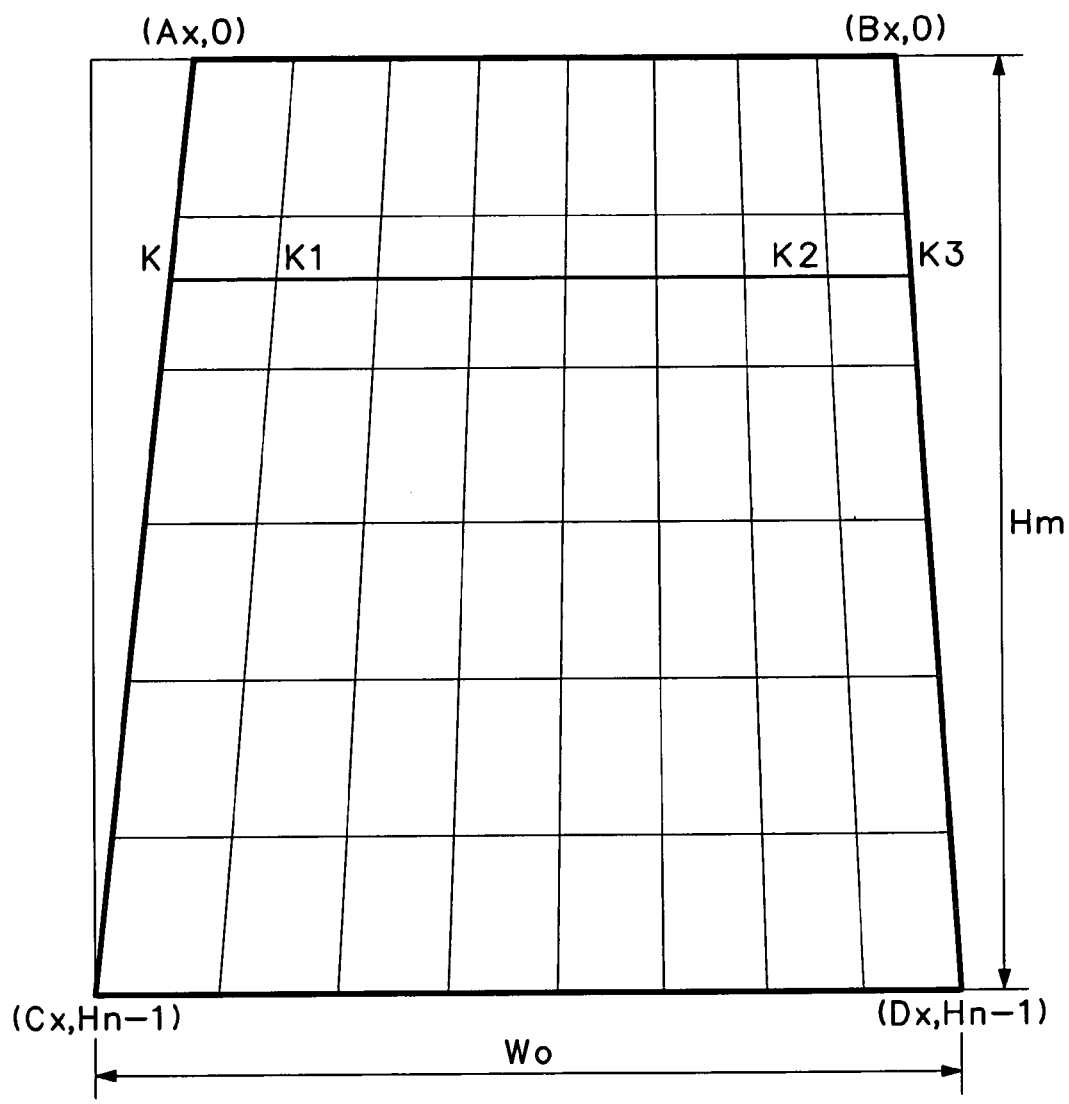
FIG. 9 is a diagram of a predistorted image to correct vertical keystone distortion.

At block 506, the method 500 horizontally scales the video signal 109. The horizontal scalar 156 addresses keystone distortion sourced from a projector possessing a vertical tilt angle Vkey. One possible result of a horizontally scaled video image is shown in FIG. 9. Referring to FIG. 9, the coordinates of the four corner points A(Ax,0), B(Bx, 0), C(Cx, Hn−1), and D(Dx, Hn−1) are given in parentheses where Hn and Wn are the height and width of the original image signal 109 and Ho and Wo are the height and width of the predistorted image. The horizontal scalar 156 uses any kind of scaling technology known to a person of reasonable skill in the art. We explain an embodiment of an operation of the horizontal scalar 156 and of block 506 in more detail below referencing FIG. 10.

At block 508, the method 500 stores the horizontally scaled video signal 109 into a line buffer 157. The line buffer 157 may be any kind of semiconductor memory device, including dynamic (e.g., DRAM) and static (e.g., SRAM) access memories. The line buffer 157 may have any size appropriate for storing any number of lines of the horizontally scaled video signal 109. In an embodiment, the line buffer 157 contains several lines of the horizontally scaled video signal 109 provided by the horizontal scalar 156. In an embodiment, the line buffer 157 includes four lines of a horizontally scaled image output from the horizontal scalar 156.

At block 510, the method 500 vertically scales horizontally scaled and buffered lines of the video signal 109. The vertical scalar 158 addresses keystone distortion sourced from a projector having a horizontal pan angle Hkey. An example of a predistorted image having been vertically and horizontally scaled is shown in FIGS. 7 and 8. The vertical scalar 158 uses any kind of scaling technology known to a person of reasonable skill in the art. In an embodiment, the input to the vertical scalar 158 is sequential, e.g., line by line. But the output of the vertical scalar 158 is not sequential. The vertical scalar 158 determines if the current input correspond to an output pixel. If it does, the scalar 158 will determine a position for the output pixel. If the vertical scalar 158 determines the current input does not correspond to an output pixel, it will skip the current input and go directly to the next input. We explain the operation of the vertical scalar 158 and of block 510 in more detail below referencing FIG. 11.

At block 512, the method 500 stores the horizontally and vertically scaled image data in a buffer 159. The buffer 159 may be any kind of semiconductor memory device, including dynamic (e.g., DRAM) and static (e.g., SRAM) access memories. The buffer 159 may have any size appropriate for storing the horizontally and vertically scaled image data. In an embodiment, the buffer 159 contains at least a frame of the horizontally and vertically scaled image data.

At block 514, the method 500 provides the image data 132 to a display 160 for projection. The predistorted image 132 will project as a distortion free image 25 as shown in FIGS. 1 and 6.

Referring to FIGS. 7 and 8, we define several variables used by the system 100 (and method 500) to predistort the signal 109. Hn and Wn are the height and width, respectively, of the original image contained in the digital video signal 109. $H_0$ and $W_0$ are the height and width, respectively, of the predistorted image contained in data 132. The system 100 also uses variables nX0, nX1, nY0, nY1, nY2, A3, B3, C3, and D3 to vertically scale the image 109 as we discuss further below.

Figure 10:
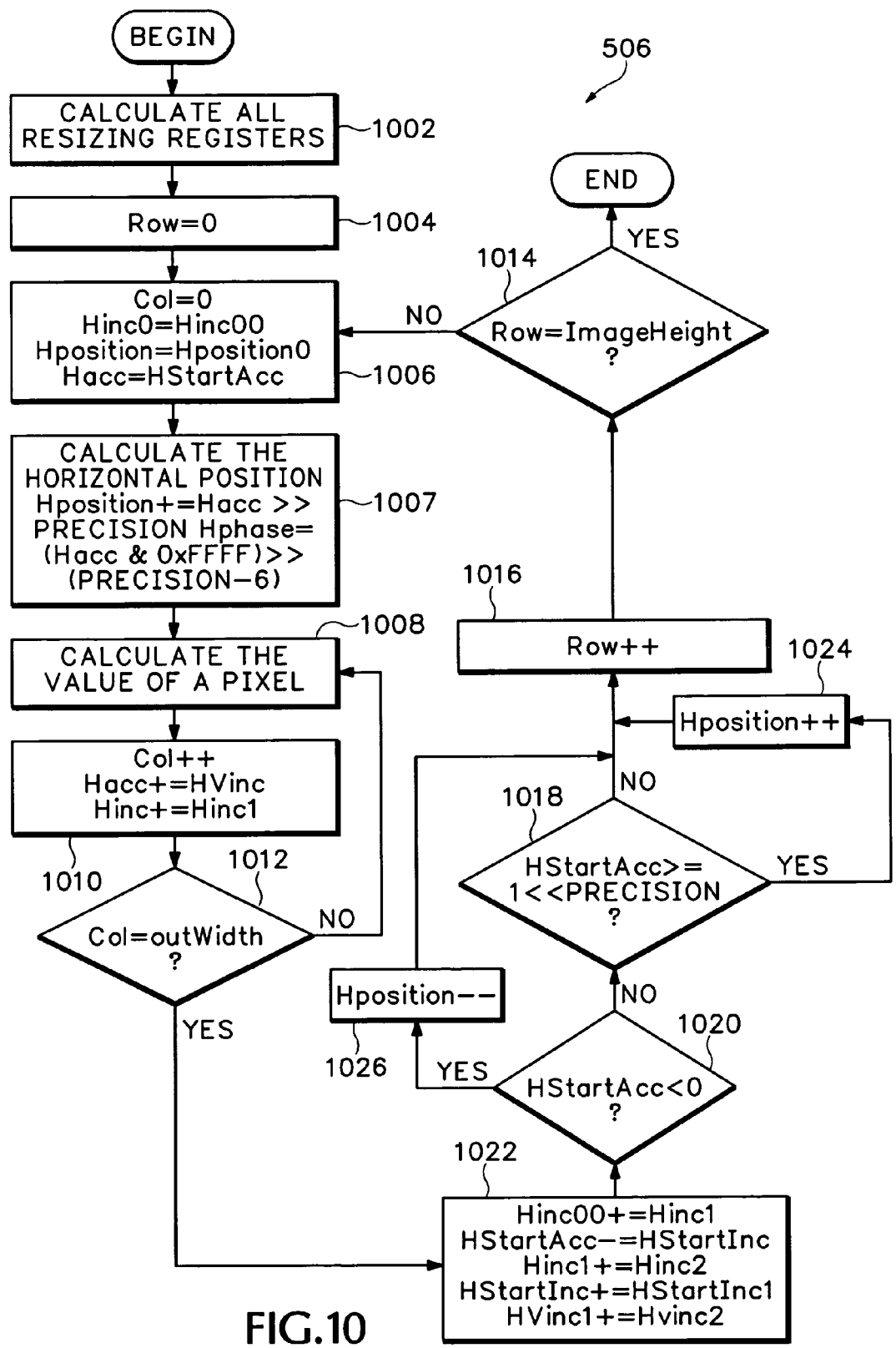
FIG. 10 is a flow diagram of an embodiment of an operation of the horizontal scalar associated with block 506 of FIG. 5.

FIG. 9 is a diagram of a predistorted image to correct vertical keystone distortion. FIG. 10 is a flow diagram of an embodiment of an operation of the horizontal scalar 156 associated with block 506 of FIG. 5. Referring to FIGS. 4-5, 9 and 10, the system 100 horizontally scales the video signal 109 at block 506 to correct for vertical distortion using the horizontal scalar 156.

The horizontal scalar 156 uses the following horizontal scaling registers.

nXStartInc=((Cx−Ax)*Wn/(Bx−Ax))/Hn<<PRECISION
nXStartInc1=k1*(Vkey)*Wo/((Bx−Ax);
Hinc00=(Wn<<PRECISION)/(Bx−Ax);
Hinc1=(Hinc00−(Wn <<PRECISION)/Wo)/Hn;
HVinc0=HVinc00*((Cy−A3$y$)−(Dy−B3$y$))/Hn;
HVinc1=(Hinc00−HVinc0)/Wo;
HVinc2=HVinc1*(Wo/(Bx−Ax)−1)/Hn;
Hinc2=k2*HVinc1*(abs(Vkey))*Vkey;

nXStartInc is a register adapted to indicate the changing of beginning position per row of the active image contained in video signal 109, corresponding to the line connecting the two left corner points (Ax,0) and (Cx,Hn−1) shown in FIG. 9. nXStartInc1 is a register to make the line connecting the two left corner points (Ax,0) and (Cx,Hn−1) straight.

The horizontal scaling factor Hinc is changing in both vertical and horizontal directions. Other registers in the above list are used to modify Hinc to reflect its changing in both directions.

In an embodiment, the variable PRECISION is a bit width assigned to the registers such that the calculation of all parameters in the scalar will be accurate enough to ensure the final predistorted image will be accurate. In an embodiment, PRECISION for the horizontal scalar is 16.

At block 1002, the horizontal scalar 156 calculates a plurality of horizontal scaling registers we indicate above. At blocks 1004 and 1006, the horizontal scalar 156 initializes a plurality of variables including Row, Column (Col), Horizontal Scaling Increment (Hinc0), Horizontal Position (Hposition), and Horizontal Accumulator (Hacc). In an embodiment, the horizontal scalar 156 initializes the registers as follows.

Col=0
Hinc0=Hinc00
Hposition=Hposition0
Hacc=HStartAcc

At block 1007, the horizontal scalar 156 calculates the horizontal position Hposition. In an embodiment, Hposition refers to the X coordinate of the reference pixel of the input image on the current line. The horizontal scalar 156 also calculates the horizontal phase Hphase for the polyphase filter to use in block 1008.

Hposition+=Hacc >>PRECISION
Hphase=(Hacc&0xFFFF)>>(PRECISION−6)

At block 1008, the horizontal scalar 156 calculates the value of an output pixel using well known filtering techniques, e.g., polyphase filtering. A person of reasonable skill in the art should recognize other techniques for determining the output pixel that come within the scope of the present invention. In an embodiment, the horizontal scalar 156 uses five tap polyphase filters.

At block 1010, the horizontal scalar 156 increments the column register Col to a next column. And the horizontal scalar 156 increments Hacc with HVinc and increments Hinc with Hinc1.

At block 1012, the horizontal scalar 156 determines whether the last column of the image contained in video signal 109 is processed. In an embodiment, the horizontal scalar 156 determines whether the column register Col equals the column width register outWidth. If it does not, the horizontal scalar 156 goes to block 1008 and calculates the value of the pixel in the next column (since it incremented the column register Col in block 1010). If the horizontal scalar 156 determines the last column has been processed, it proceeds to block 1022.

At block 1022, the horizontal scalar 156 recalculates several registers, including setting the Hinc00 register to the sum of the registers Hinc00 and Hinc1. The horizontal scalar 156 sets the HstartAcc register to the difference of registers HStartAcc and HStartInc, the Hinc1 register to the sum of registers Hinc1 and Hinc2, and the HStartInc register to the sum of registers HStartInc and HStartInc1. And the horizontal scalar 156 sets the register HVinc1 to the sum of registers HVinc1 and HVinc2.

At block 1020, the horizontal scalar 156 determines whether the HStartAcc register is less than 0. If it is, it decreases the horizontal position register Hposition at block 1026. If it is not, the horizontal scalar 156 determines at block 1018 whether the HStartAcc register is greater than or equal to 1 left shifted by PRECISION bits. If it is, the horizontal scalar 156 increments the horizontal position register Hposition at block 1024. If it is not, the horizontal scalar 156 increases Row at block 1016. At block 1014, the horizontal scalar 156 determines whether the last row has been processed. In an embodiment, the horizontal scalar 156 determines whether the row register Row equals the ImageHeight register. If it is, the horizontal scalar 156 ends processing.

FIG. 11 is a flow diagram of an embodiment of an operation of the vertical scalar 158 associated with block 510 of FIG. 5. Referring to FIG. 11, the vertical scalar 158 processes a set of pixels of the output image, the corresponding pixels of the input image will be fixed in one row or line. The row of the input image is represented by the register nVposition. When the scalar 158 advances one output pixel in the horizontal direction, the scalar 158 will judge if this pixel corresponds to a pixel of the fixed row (or line) of the input image. If it is, the vertical scalar 158 will produce an output pixel. Otherwise, the vertical scalar 158 will either go down a row (as shown in FIG. 7) or go up a row (as shown in FIG. 8) to find the position corresponding to the fixed row of the input image. Put differently, the vertical scalar 158 processes the image according to the input image row by row. After it completes processing one row of the input image, the scalar 158 will go to the next row of the input image and the previous row will be discarded and any pixel in that row will never be referred to again.

More particularly, at block 1102, the vertical scalar 158 calculates the following vertical resizing registers.

nYStartInc=((B3$x$−A3$x$)<<VPRECISION)/(max(Bx, Dx)−min(Ax,Cx)−1)

nYStartInc1=k3*nYStartInc/(max(Bx,Dx)−min(Ax,Cx)−1)

nYStartInc2=k4*nYStartInc1/(max(Bx,Dx)−min(Ax, Cx)−1)

nHVinc02=(Hn<<VPRECISION)/(D3$y$−C3$y$))
    nHVinc0=(Hn<<VPRECISION)/(B3$y$−A3$y$))
    nHVinc10=nHVinc11=(nHVinc02−nHVinc0)/(Bx−Ax)
    nVinc=(Hn<<VPRECISION)/(B3$y$−A3$y$))
    nVinc0=(in Width<<VPRECISION)/(Bx−Ax)
    nVinc00=(in Width<<VPRECISION)/(Cx−Dx)
    nVinc1=(nVinc00−nVinc0)/(max(Bx,Dx)−min(Ax,Cx))* (nVKeyHeight−nHKeyHeight)/nImageHeight
    nVinc0=nHVinc0
    nVinc00=nHVinc02

In an embodiment, the variable VPRECISION is a bit width assigned to the registers such that the calculation of all parameters in the scalar 158 will be accurate enough to ensure the final predistorted image will be accurate.

The nYStartInc register indicates the changing of vertical start position per column of the active image, corresponding to line A3-B3 in FIG. 7 and line A-B in FIG. 8. Since A3 or A could be either greater or smaller than B3 or B, nYStartInc could be either positive or negative. Since the active image is based on line A3-B3 or A-B, the nYStartInc register is applied whenever a column advance occurs.

The nYStartInc1 and nYStartInc2 registers reduce the curvature of line A3-B3 in FIG. 7 or line A-B in FIG. 8.

The nHVinc02 register is a vertical scaling factor on the right hand side of the image. Likewise, the nVHinc0 register is a vertical scaling factor on the left hand side of the image. And nHVinc10 and nHVinc11 registers describe the vertical scaling factor changing rate on the horizontal direction.

The nVinc0 register is a horizontal scaling factor on the top of the image. Likewise, the nVinc00 register is a horizontal scaling factor on the bottom of the image. And nVinc1 describes the vertical scaling factor changing rate on the vertical direction corresponding to the change of the horizontal scaling factor.

In an embodiment, the image is limited to a range, e.g., nY0<=nRow<nY1 and nX0<=nCol<nX1.

At block 1104, the vertical scalar 158 initializes the nRow and nVposition registers to Y2 and 0, respectively.

At block 1106, the vertical scalar 158 checks the nFlag register and initializes various predetermined variables. At the beginning of each row, the vertical scalar 158 will determine how many pixels in the original image it will jump in the vertical direction when the next row is processed. This number is the nCarry register. When the keystone correction occurs, the vertical scalar 158 is, in an embodiment, shrinking the image. The nCarry register, therefore, is always greater than or equal to 1. When nCarry=1, when the vertical scalar 158 processes the next row of the output image, the corresponding row of the input image, represented by the nVposition register, will be advanced to the next row of the input image. Alternatively, if nCarry>1, when the vertical scalar advances to the next row of the output image, the corresponding row of the input image will advance more than one row. The vertical scalar 158, therefore, will process the rows of the input image that would otherwise be skipped before the next row of the output image is processed.

Figure 12:
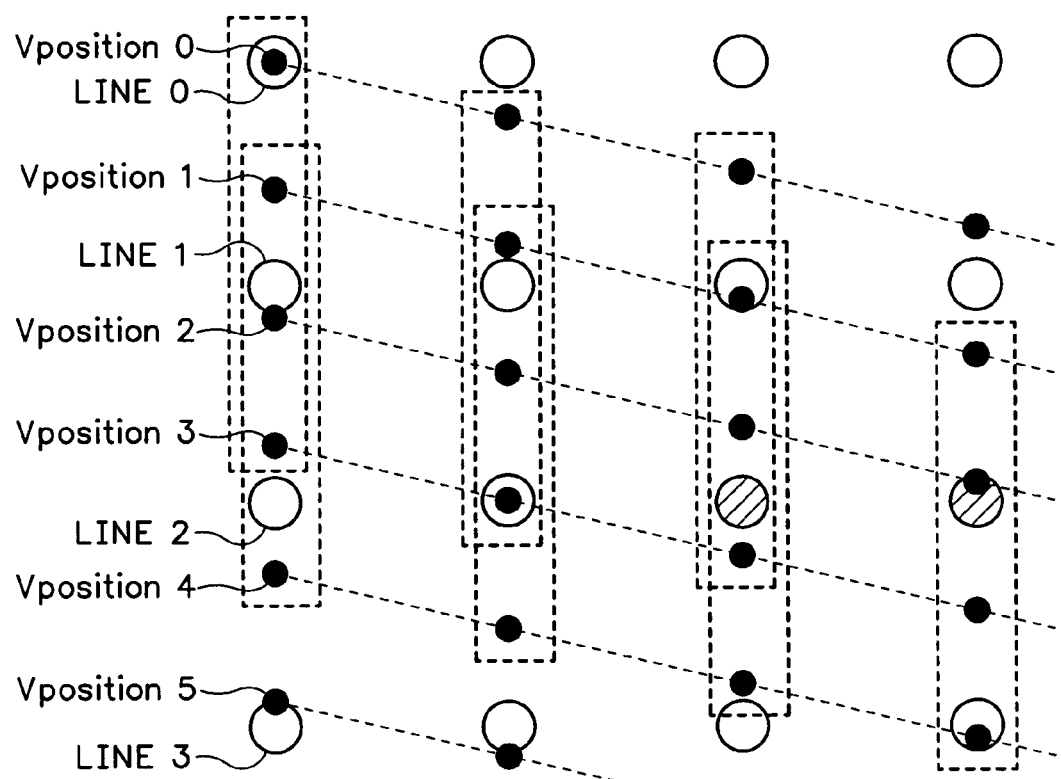
FIG. 12 is a graphical representation to illustrate an embodiment of a system and method of keystone correction.

FIG. 12 is a graphical representation to illustrate block 1106. Referring to FIG. 12, the black dots represent pixels of the input image and circles represent pixels of the output image. The nCarry register corresponding to rows 0, 1, and 2 are 1, 2, and 2 respectively. At the very beginning, when the scalar 158 processes Row 0, the corresponding row of the input image Vposition is 0. When the scalar 158 advances to the next row (e.g., Row 1), the corresponding row of the input image Vposition is 1 because the output pixel is between Vposition 1 and Vposition 2.

The variable nFlag records how many intermediate rows of the input image the scalar 158 has processed. If nCarry is greater than 1, when the scalar 158 advances to the next row, the corresponding input position Vposition will advance more than one row. Before advancing to the next row of the output image, the scalar 158 processes all those rows of the input image before processing the next row in the output image. Referring to FIGS. 9 and 12, after the scalar 158 processes Row 1, before it advances to Row 2 corresponding to Vposition 3 of the input image, the scalar 158 processes portions of the output image that uses the pixels in row Vposition 2 of the input image. The two gray crosshatched pixels in FIG. 12 belong in this category.

Figure 13:
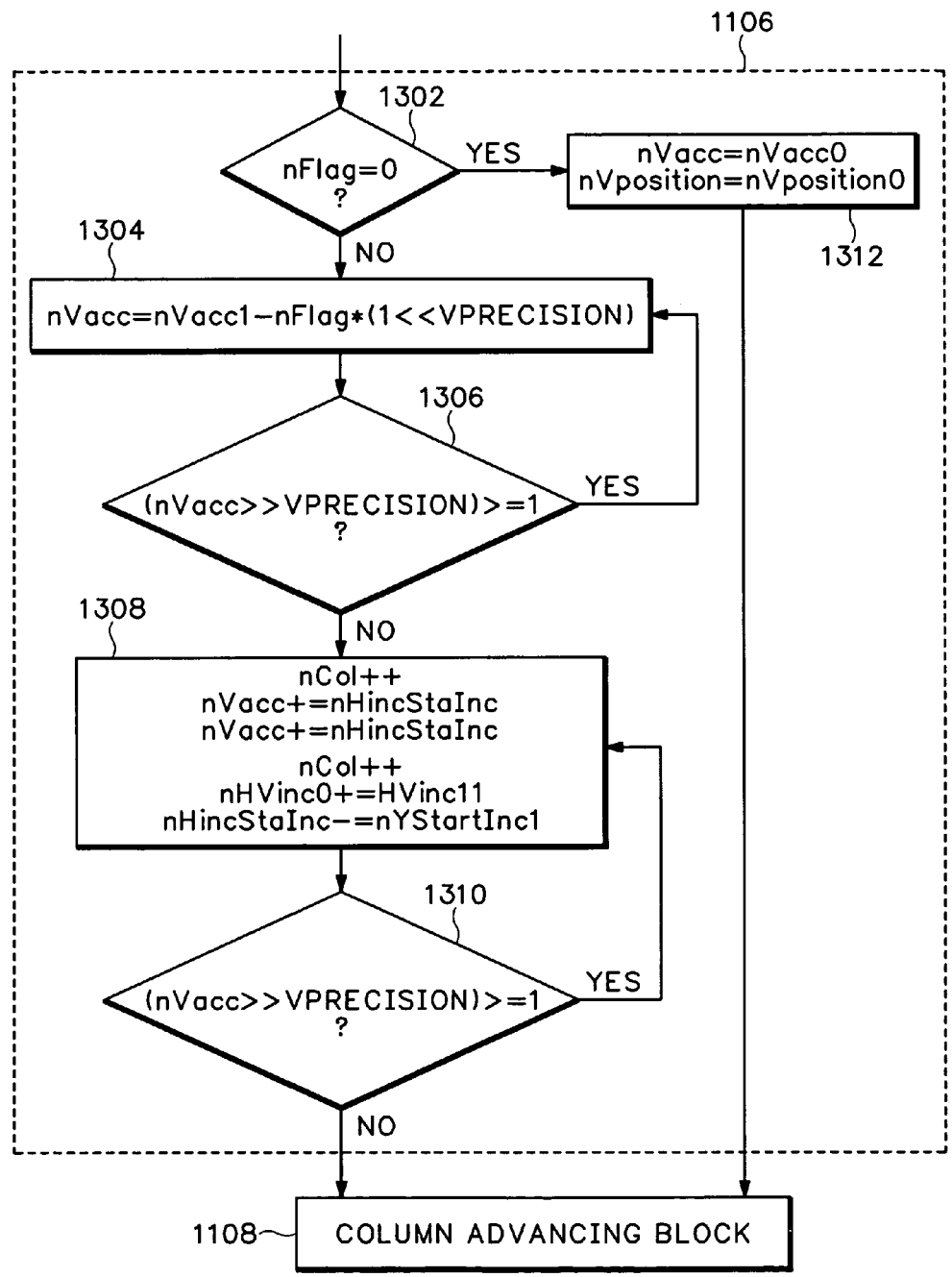
FIG. 13 is a block diagram of an embodiment of the initialization circuit associated with block 1106 of FIG. 11.

FIG. 13 is a block diagram of an embodiment of the initialization circuit associated with block 1106 of FIG. 11. Referring to FIG. 13, at block 1302, the vertical scalar 158 determines whether the nFlag is zero. If so, the vertical scalar sets the nVacc and nVposition registers to nVacc0 and nVposition0, respectively (block 1312). If not, the vertical scalar 158, sets the nVacc register to the difference of the registers nVacc1 and nFlag left shifting VPRECISION bits (block 1304). At block 1306, the vertical scalar 158 determines whether the nVacc right shifted by VPRECISION bits is greater than or equal to 1. If not, the vertical scalar 158 increments the nCol register, sets the nVacc register to the sum of nVacc and NHincStartInc, and modifies other variables as follows (block 1308).

nVacc+=nHincStaInc
    nCol++
    nHVinc0+=nHVinc11
    nHincStaInc−=nYStartInc1

At block 1310, the vertical scalar 158 determines whether the nVacc right shifted by VPRECISION is greater than or equal to 1. If it is, the vertical scalar will go back to block 1308 continuing the modification of variables. If it is not, the vertical scalar 158 moves to block 1108.

At block 1108, the vertical scalar 158 advances a column as we explain in more detail referencing FIGS. 14A-B. FIGS. 14A-B are a block diagram of an embodiment of the advancing circuit associated with block 1108 of FIG. 11. Referring to FIGS. 14A-B, at block 1402 the vertical scalar 158 determines whether the nVacc register shifted right by VPRECISION bits equals zero.

At block 1403, the scalar 158 calculates the phase of the vertical scalar as follows.

nVphase=nVacc>>(VPRECISION−6)

At block 1404, the vertical scalar 158 calculates the value of an output pixel using well known filtering techniques, e.g., polyphase filtering. A person of reasonable skill in the art should recognize other techniques for determining the output pixel that come within the scope of the present invention. In an embodiment, the horizontal scalar 156 uses five tap polyphase filters.

At block 1406, the scalar 158 moves to a next column by incrementing the nCol register. And the scalar 158 sets the nVacc register to the sum of the nVacc and nHincStartInc registers. At block 1408, the scalar 158 determines whether it has processed the last column of the image in signal 109 by determining whether the nCol register is equal to the ImageWidth register. If it has not processed the last column, the scalar 158 continues processing pixels at block 1402. If the scalar has processed the last column, the scalar continues at block 1110.

If the scalar 158 determines the nVacc register shifted right by VPRECISION bits does not equal zero, it then determines whether nVacc register shifted right by VPRECISION bits is greater than zero (block 1412). If it does, the scalar 158 determines whether the nCarry register meets the condition we describe in block 1414. If it does, the scalar sets nCol1 to nCol and records the following variables (block 1416).

nAcc=nVacc−(1<<VPRECISION)
nHVinc01=nHVinc0
nHincStaInc1=nHincStaInc
nYStartInc12=nYStartInc1

At block 1418, the scalar 158 decrements the Row1 variable, sets the nVacc register to the difference of nVacc and nHVinc0 registers, and modifies the registers as follows.

nYStartInc1+=nYStartInc2
nHVinc0−=nVinc1
nVacc−=nHVinc0
while (nVacc<0 && nCol<ImageWidth)
{
nVacc+=nHincStaInc
nCol++
nHVinc0+=nHVinc11
nHincStaInc−=nYStartInc1
}

At block 1420, the scalar 158 determines whether the nRow1 register is less than nY0. If it is, the scalar 158 goes to block 1100. If it is not, the scalar 158 determines whether the nVacc register is less than zero (block 1422). If it is not, the scalar 158 goes to block 1402. If it is, the scalar 158 increments the nCol register, sets the nVacc register to the sum of the nHinStartInc and nVacc registers, and modifies other variables as follows (block 1424).

nVacc+=nHVinc0
nHVinc0+=nVinc1
while ((nVacc>>VPRECISION)>=1 && nCol<ImageWidth)
{
nVacc+=nHincStaInc
nCol+=nCinc1
nHVinc0+=nHVinc11
nHincStaInc−=nYStartInc1

In an embodiment, the configuration for the maximum horizontal resolution is 1920, which requires an unsigned register with a length of 12 bits. All numbers larger than 1920 remain unused. Therefore, we may use a 12 bit number larger than 1920 as a flag to indicate that this register has not been used. In an embodiment, 2047 is pre-assigned to the register nCol1.

At block 1426, the scalar 158 determines whether nCol equals nX1. If it does, the scalar compares the nCol1 register to a predetermined number, e.g., 2047 (block 1428). If nCol1 equals to 2047, the scalar 158 goes to block 1110. Otherwise the vertical scalar 158 goes to block 1410 to get the value of the registers from the registers that recorded from block 1416 and modifies nCarry as follows.

nCol=nCol1
nVacc=nAcc
nHVinc0=nHVinc01
nHincStaInc=nHincStaInc1
nYStartInc1=nYStartInc12
if (nCarry>1 && (nVacc >>VPRECISION)>=1)
{
nacc=nVacc−(1<<VPRECISION)
nCarry—
}
else
{
nCol1=2047
}

If the scalar 158 determines the nVacc register shifted right by VPRECISION bits is not greater than zero (block 1412), it increases the Row1 register, sets the nVacc register to the sum of the nVacc and nHVinc0 registers, and modifies other variables as follows (block 1430).

nRow1++
nYStartInc1−=nYStartInc2
nVacc+=nHVinc0
nHVinc0+=nVinc1
while ((nVacc>>VPRECISION)>=1 && nCol<ImageWidth)
{
nVacc+=nHincStaInc
nCol++
nHVinc0+=nHVinc11
nHincStaInc−=nYStartInc1
}

At block 1432, the scalar 158 compares the nRow1 and nY1 registers. If equal, the scalar 158 goes to block 1110. If unequal, the scalar 158 determines whether the nVacc register shifted right by VPRECISION bits is greater than 0 (block 1434). If it is, the scalar 158 increments the nCol register, sets the nVacc register to the sum of nVacc and nHinStartInc registers, and modifies other variables as follows (block 1436).

nCol++
nVacc+=nHincStaInc
nHincStaInc−=nYStartInc1
nHVinc0+=nHVinc11

At block 1438, the scalar 158 determines whether it has processed the last column by comparing nCol to the ImageWidth. If it has not, the scalar will continue processing at block 1434. If it has, the scalar goes to block 1110.

At block 1110, the vertical scalar 158 checks the nCarry and nFlag registers, as we explain in more detail referencing FIG. 15. FIG. 15 is a block diagram of an embodiment of the checking circuit associated with block 1110 of FIG. 11.

Referring to FIG. 15, the scalar 158 determines whether the difference of nCarry and nFlag registers equals zero (block 1502). If it does, the scalar 158 goes to block 1504. The block 1504 increments the nrow register, sets the nVacc register to the sum of nVacc and nVin0, sets the nVposition0 register to the sum of nVposition0 and nVacc0 shifted right by VPRECISION bits, and modifies other variables as follows.

if (nVacc0>>VPRECISION==2)
nVacc0-=nYStartInc2
nVacc1=nVacc0+nVinc0
nVinc0+=nVinc1
nHincStaInc0+=nHVinc11-nYStartInc10
nYStartInc11-=nYStartInc2
nVphase=nVacc0>>(VPRECISION-6)

The scalar 158 goes to block 1112 (FIG. 11).

If at block 1502 the scalar 158 determines the difference of nCarry and nFlag registers unequal to zero, it then determines whether the same difference equals one (block 1506). If it does, the scalar 158 sets the nVacc0 register to the sum of nVacc0 and nVinc0 and sets the nVposition0 register to the sum of nVposition0 and nVacc0 shifted right by PRECISON bits (block 1508). The scalar 158 determines whether nCarry equals 1 at block 1510. If it does, the scalar 158 increments nRow and modifies other variables at block 1512 as follows.

nVinc0+=nVinc1
nHincStaInc0+=nHVinc11-nYStartInc10i
nYStartInc11-=nYStartInc2

Otherwise, the scalar 158 sets nCarry to the sum of nVacc0 and nVinc0 right shifted by VPRECISION bits and sets nFlag to zero (block 1514).

If at block 1506 the scalar 158 determines the difference of nCarry and nFlag registers to be unequal to one, it determines whether nFlag equals zero (block 1516). If it does, the scalar 158 increments nRow and modifies other variables at block 1518 as follows.

nRow++
nVacc1=nVacc0+nVinc0
nVinc0+=nVinc1
nVacc1-=(nVposition-nVposition0)<<VPRECISION
nHincStaInc0+=nHVinc11-nYStartInc10
nYStartInc11-=nYStartInc2

At block 1520, the scalar 158 increments the nFlag and nVposition registers.

We have illustrated and described embodiments of the keystone correction system and method by way of illustrative and not restrictive examples. Those of skill in the art will recognize certain modifications, permutations, additions, and sub-combinations to the exemplary embodiments I describe above. We intend the following claims and those claims we introduce later be interpreted to include all such modifications, permutations, additions, sub-combinations as are within the spirit and scope.

We claim:

1. A method for keystone correction, comprising:
   calculating at least one corner point of a predistorted image;
   horizontally scaling an input image responsive to the calculating;
   storing N lines of the horizontally scaled input image in a line buffer, where N is an integer and is less than a total number of lines in the horizontally scaled input image; and
   generating the predistorted image by continuously vertically scaling the N lines; and
   storing the predistorted image in a frame buffer.

2. The method of claim 1 where calculating the at least one corner point occurs responsive to receiving at least one projector parameter.

3. The method of claim 2 where receiving the at least one projector parameter includes receiving one of a horizontal pan angle and a vertical tilt angle.

4. The method of claim 1 where storing the N lines includes storing the N lines in a line memory.

5. The method of claim 1 where generating the predistorted image by continuously vertically scaling includes scanning the N lines column by column.

6. The method of claim 5 where scanning the N lines includes:
   determining if there is an output pixel corresponding to a currently scanned column of pixels;
   skipping the currently scanned column of pixels to advance to another adjacent column responsive to the determining;
   vertically scaling the currently scanned column of pixels to generate a horizontal keystone corrected pixel responsive to the determining;
   selecting a location in the output frame to place the horizontal keystone corrected pixel;
   placing the horizontal keystone corrected pixel in the location; and
   repeating the determining, skipping, vertically scaling, selecting, and placing until a final column of the N lines is reached.

7. The method of claim 1 comprising projecting the predistorted image on a surface.

8. A keystone correction system, comprising:
   a horizontal scalar to horizontally scale an input image responsive to at least one corner of a predistorted image;
   a line memory to store N lines of the horizontally scaled input image, where N is an integer and is less than a total number of lines in the horizontally scaled input image;
   a vertical scalar to continuously vertically scale the N lines to generate the predistorted image;
   a frame buffer to store the predistorted image; and
   a projector to project the predistorted image on a surface.

9. The keystone correction system of claim 8 where the horizontal scalar is adapted to calculate the at least one corner of the predistorted image responsive to projector parameters.

10. The keystone correction system of claim 9 where the projector parameters include one of a horizontal pan and vertical tilt angle.

11. The keystone correction system of claim 8 where the vertical scalar is adapted to scan the N lines column by column.

12. The keystone correction system of claim 8 where the vertical scalar includes a processor adapted to:
   determine if there is an output pixel corresponding to a currently scanned column of pixels;
   skip the currently scanned column of pixels to advance to another column responsive to the determining;
   vertically scale the currently scanned column of pixels to generate a horizontal keystone corrected pixel responsive to the determining;
   select a location in the output frame to place the horizontal keystone corrected pixel; and
   place the horizontal keystone corrected pixel in the location.

13. A keystone correction system, comprising:
   means for calculating at least one corner point of a predistorted image;
   means for horizontally scaling an input image responsive to the means for calculating;

means for storing N lines of the horizontally scaled input image, where N is an integer and is less than a total number of lines in the horizontally scaled input image;

means for continuously vertically scaling the N lines to generate the predistorted image;

means for storing the predistorted image; and means for projecting the predistorted image on a surface.

14. The system of claim 13 where the means for calculating the at least one corner point includes means for calculating the at least one corner point responsive to receiving at least one projector parameter.

15. The system of claim 13 where the means for receiving the at least one projector parameter includes means for receiving one of a horizontal pan angle and a vertical tilt angle.

16. The system of claim 13 where the means for storing the N lines includes a line memory means.

17. The system of claim 13 where the means for continuously vertically scaling includes means for scanning the N lines column by column.

18. The system of claim 13 where the means for scanning includes:

means for determining if there is an output pixel corresponding to a currently scanned column of pixels;

means for skipping the currently scanned column of pixels to advance to another adjacent column responsive to the means for determining;

means for vertically scaling the currently scanned column of pixels to generate a horizontal keystone corrected pixel responsive to the means for determining;

means for selecting a location in the output frame to place the horizontal keystone corrected pixel; and means for placing the horizontal keystone corrected pixel in the location.

19. An article comprising a storage medium, the storage medium having stored instructions, that, when executed by a machine result in:

calculating at least one corner point of a predistorted image;

horizontally scaling an input image responsive to the calculating;

storing N lines of the horizontally scaled input image in a line buffer, where N is an integer and is less than a total number of lines of the horizontally scaled input image;

continuously vertically scaling the N lines to generate the predistorted image;

storing the predistorted image in a frame buffer; and projecting the predistorted image on a surface.

20. The article of claim 19 where calculating the least one corner occurs responsive to receiving at least one projector parameter.

21. The article of claim 19 where receiving the at least one projector parameter includes receiving one of a horizontal pan angle and a vertical tilt angle.

22. The article of claim 19 where storing the N lines includes storing in a line memory.

23. The article of claim 19 where continuously vertically scaling includes scanning the N lines column by column.

24. The article of claim 23 where scanning the N lines column by column includes:

determining if there is an output pixel corresponding to a currently scanned column of pixels;

skipping the currently scanned column of pixels to advance to another adjacent column responsive to the determining;

vertically scaling the currently scanned column of pixels to generate a horizontal keystone corrected pixel responsive to the determining;

selecting a location in the output frame to place the horizontal keystone corrected pixel;

placing the horizontal keystone corrected pixel in the location; and repeating the determining, skipping, vertically scaling, selecting, and placing until a final column of the N lines is reached.

* * * * *